United States Patent
Hilmann et al.

(10) Patent No.: US 8,770,653 B2
(45) Date of Patent: Jul. 8, 2014

(54) BODYWORK ARRANGEMENT FOR A FRONT END AND A PASSENGER COMPARTMENT OF A VEHICLE

(71) Applicant: Ford Global Technologies, LLC, Dearborn, MI (US)

(72) Inventors: Joergen Hilmann, Leverkusen (DE); Jens Buechner, Pulheim (DE); Michael Keimes, Neuss (DE); Klaus Steputsch, Cologne (DE); Uwe Wagner, Wermelskirchen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/838,064

(22) Filed: Mar. 15, 2013

(65) Prior Publication Data
US 2013/0270869 A1   Oct. 17, 2013

(30) Foreign Application Priority Data
Apr. 16, 2012 (DE) .......................... 10 2012 206 200

(51) Int. Cl.
*B60R 21/02* (2006.01)
*B62D 21/02* (2006.01)

(52) U.S. Cl.
CPC ...................... *B62D 21/02* (2013.01)
USPC ................................ 296/187.09; 296/203.02

(58) Field of Classification Search
CPC ............................. B62D 21/02; B62D 21/152
USPC ................. 296/187.09, 193.08, 203.02, 205
See application file for complete search history.

(56) References Cited

U.S. PATENT DOCUMENTS

| | | | | |
|---|---|---|---|---|
| 4,660,345 A | * | 4/1987 | Browning | 52/653.2 |
| 6,705,670 B2 | * | 3/2004 | Forssell et al. | 296/187.09 |
| 7,469,956 B2 | * | 12/2008 | Yasuhara et al. | 296/187.09 |
| 8,002,337 B2 | * | 8/2011 | Baccouche et al. | 296/203.02 |
| 8,459,728 B2 | * | 6/2013 | Fujii et al. | 296/203.02 |
| 8,485,592 B2 | * | 7/2013 | Shin et al. | 296/203.02 |

* cited by examiner

*Primary Examiner* — Lori Lyjak
(74) *Attorney, Agent, or Firm* — Raymond L. Coppiellie; Brooks Kushman P.C.

(57) ABSTRACT

Bodywork arrangement comprising longitudinal members and cross-members that are connected at node points to other lateral structural elements to form part of a passenger compartment and part of a vehicle front end. Longitudinal members are provided at the lower side of the passenger compartment. Front-end longitudinal members are arranged on the vehicle front end. A front region of the passenger compartment has a floor cross-member, a splashboard cross-member, an armature cross-member and laterally arranged A-column elements. The floor cross-member together with the splashboard cross-member and two lateral structural elements form a lower trapezoidal structure. The splashboard cross-member together with the armature cross-member (9) and two lateral structural elements forms an upper trapezoidal structure. The space between the upper trapezoidal structure and the lower trapezoidal structure defines the foot space of the passenger compartment.

10 Claims, 2 Drawing Sheets

BODYWORK ARRANGEMENT FOR A FRONT END AND A PASSENGER COMPARTMENT OF A VEHICLE

CROSS-REFERENCE TO RELATED APPLICATIONS

This application claims foreign priority benefits under 35 U.S.C. §119(a)-(d) to DE 10 2012 206 200.9, filed Apr. 16, 2012, which is hereby incorporated by reference in its entirety.

TECHNICAL FIELD

This disclosure relates to a bodywork arrangement comprising longitudinal members and cross members that are connected at node points to other lateral, structural elements to form part of a passenger compartment and a vehicle front end.

BACKGROUND

Vehicles generally have a passenger compartment that adjoins a front end structure. One problem with such body structures is that they reduce leg room in the passenger compartment. Another problem with these types of body structures is that they may not provide sufficient strength in the event of a collision.

U.S. Pat. No. 6,705,670 discloses a bodywork arrangement that has an acceptable level of strength but the interior space configuration in the foot space of the passenger compartment is reduced by the bodywork arrangement. The bodywork is self-supporting and is illustrated in the patent by a simplified diagram as a spatial framework that is composed of a plurality of rods. The foot space is reduced by a tension rod that engages the lateral structural elements at the end points of the tension rod. When the front-end longitudinal members apply a force to the lateral structural elements of the upper trapezoidal structure, the force component acts in a transverse direction causing the lateral structural elements to bend apart the A-column elements laterally outwardly. The tension rod is an integral component of the upper trapezoidal structure and is provided to counteract the effect of the A-column elements being bent apart.

The above problems and other problems are addressed by this disclosure as summarized below.

SUMMARY

An object of the invention is to provide a self-supporting bodywork arrangement that improves the interior space configuration in the region of the foot space of the passenger compartment and that provides an acceptable level of strength. This object is achieved by arranging the lateral structural elements of the upper trapezoidal structure at each side of the bodywork so that the node point of the splashboard cross-member is connected to the node point of the armature cross-member.

The bodywork arrangement comprises longitudinal members and cross members that are connected at node points to other lateral structural elements to form part of a passenger compartment and part of a vehicle front end. The longitudinal members are provided at the lower side of the passenger compartment. Front end longitudinal members are arranged on the vehicle front end. The front region of the passenger compartment has a floor cross-member, a splashboard cross-member, an armature cross-member and laterally arranged A-column elements. The floor cross-member and the splashboard cross-member together with two of the lateral structural elements form a lower trapezoidal structure. The splashboard cross-member together with the armature cross-member and the two remaining lateral structural elements form an upper trapezoidal structure. The space between the upper trapezoidal structure and the lower trapezoidal structure forms the foot space of the passenger compartment. One of the front-end longitudinal members is articulated to a node point of the splashboard cross-member.

The bodywork arrangement is self-supportive. The bodywork arrangement comprises shell, cast, and profile members that can be described and is constructed in a substantially symmetrical manner in a simplified schematic as rod-like longitudinal members and cross-members that are connected to lateral rod-like structural elements.

The upper trapezoidal structure has lateral structural elements that are directed outwardly and upwardly. The armature cross-member is an integral component of the upper trapezoidal structure. The function of the tension rod disclosed in U.S. Pat. No. 6,705,670 that was referenced above is performed by the armature cross-member. As a result, the tension rod may be eliminated from the body structure. The space between the lower trapezoidal structure and the upper trapezoidal structure is substantially larger. Furthermore, a pending strain of the A-column element is eliminated and the additional tension rod can be dispensed with or an additional tension rod can be constructed in a significantly easier manner.

The strength of the bodywork arrangement can be further improved by providing additional secondary longitudinal members on the floor of the passenger compartment. The secondary longitudinal members may be articulated to each secondary node point of the floor cross-member and are articulated to each secondary node point of the floor cross-member by an inner structural element. The inner structural element connects the secondary node point to the node point at that the front-end longitudinal member is connected to the splashboard cross-member.

A pressure force acting at a bodywork side in the longitudinal direction of the front-end longitudinal member is introduced into the node point of the splashboard cross-member and is divided at that location. The force is partially introduced into the lateral structural elements of the upper and lower trapezoidal structure and partially into the structural element that is connected to the secondary node point of the floor cross-member.

The bodywork arrangement can absorb greater forces at this location as a result of the inner structural elements and the secondary longitudinal members. This arrangement is an improvement over the prior art wherein forces are absorbed only by the "primary" outer longitudinal member.

The above features and aspects of this disclosure as summarized above is described in greater detail below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
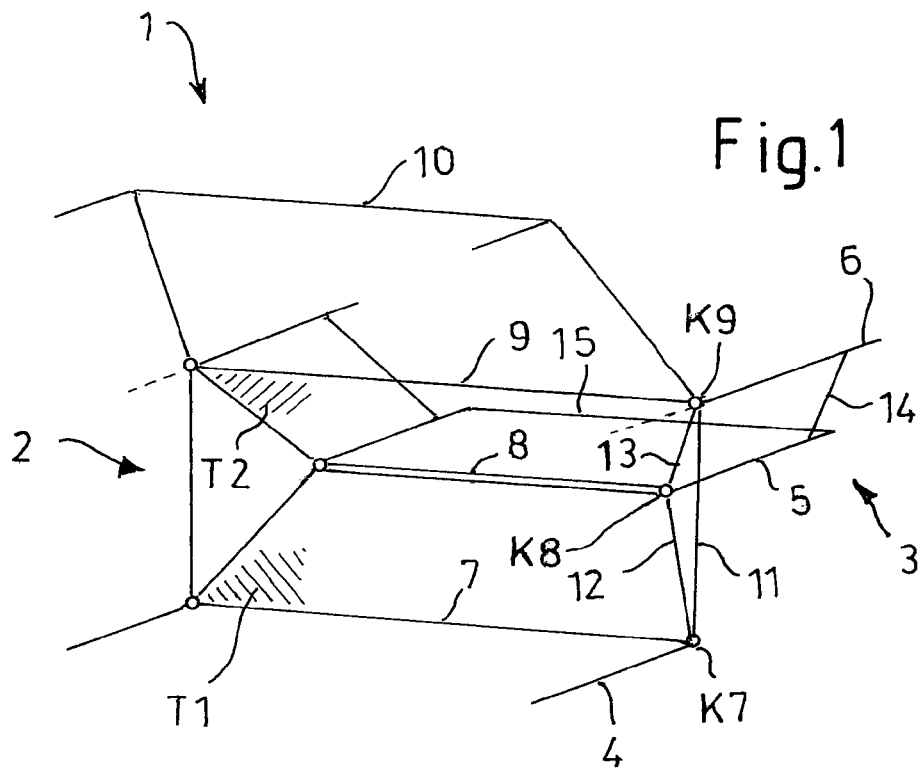
FIG. 1 is a schematic illustration of the disclosed bodywork arrangement.

The bodywork arrangement 1 according to the invention is a self-supporting bodywork that comprises bodywork-typical shell, cast and profile-members. FIG. 1 shows the bodywork arrangement according to the invention schematically and symmetrically. Accordingly, the bodywork arrangement has a passenger compartment 2 that comprises longitudinal members and cross-members that are connected to each other at node points by means of lateral structural elements. There is further provided in the passenger compartment 2 a vehicle front end 3 that also comprises longitudinal members and cross-members and lateral structural elements. The longitudinal members and cross-members form a spatial grid that defines the structure of the passenger compartment 2 and the structure of the vehicle front end 3. All the longitudinal members and all the lateral structural elements of the bodywork arrangement are provided symmetrically in pairs.

At the lower side of the passenger compartment 2, longitudinal members 4 are provided and a lower front-end longitudinal member 5 and an upper front-end longitudinal member 6 are arranged on the vehicle front end 3. A floor cross-member 7, a splashboard cross-member 8, an armature cross-member 9 and an upper windshield cross-member 10 are provided as cross-members in the front region of the passenger compartment. Furthermore, the bodywork arrangement has laterally arranged A-column elements 11 and lateral lower structural elements 12 and lateral upper structural elements 13 that connect longitudinal members and/or cross-members to each other. There is further provided in each case a lateral structural element 14 that connects the lower front-end longitudinal member 5 to the upper front-end longitudinal member 6.

At each bodywork side, at the respective end of the floor cross-member 7, there is a node point K7 to that one of the longitudinal members 4 is articulated. At the respective end of the splashboard cross-member 8 there is provided a node point K8 to that one of the lower front-end longitudinal members 5 is articulated. At the respective end of the armature cross-member 9, there is provided a node point K9 to that one of the upper front-end longitudinal members 6 is articulated. The lower front-end longitudinal members 5 are connected at the ends thereof facing away from the passenger compartment 2 to a front cross-member 15.

The floor cross-member 7 forms, together with the splashboard cross-member 8 and together with lower lateral structural elements 12, a lower trapezoidal structure T1.

The splashboard cross-member 8 forms, together with the armature cross-member 9 and together with the upper lateral structural elements 13, an upper trapezoidal structure T2.

The splashboard cross-member 8 is both part of the lower trapezoidal structure T1 and part of the upper trapezoidal structure T2. It joins the short parallel side of both trapezoidal structures T1 and T2.

The space provided between the upper trapezoidal structure T2 and the lower trapezoidal structure T1 forms the foot space of the passenger compartment 2.

Figure 2:
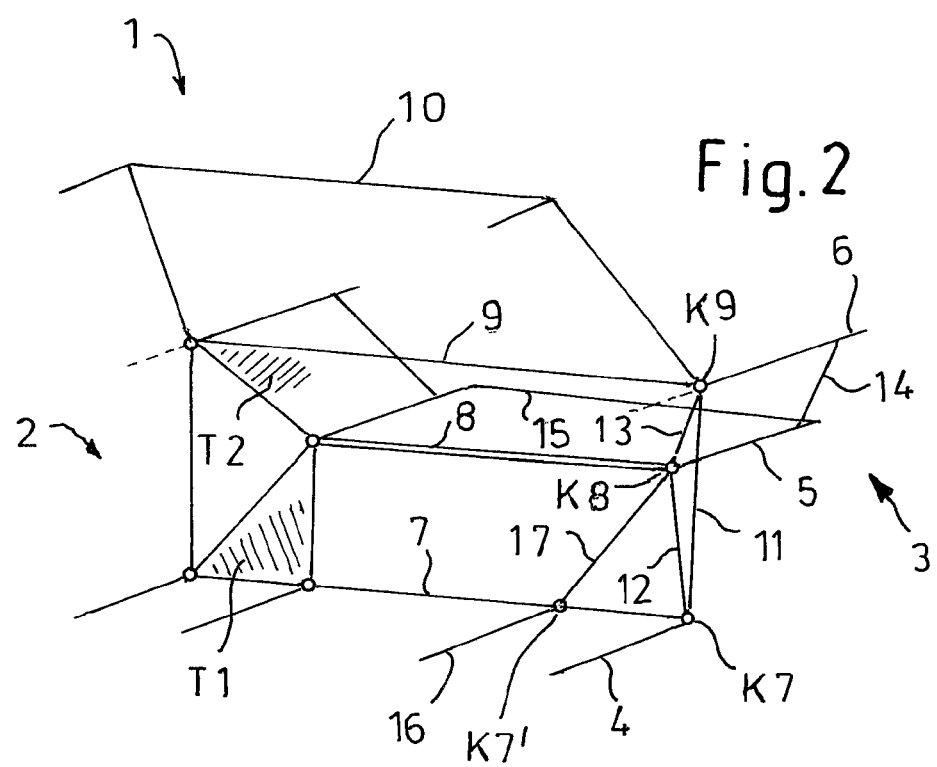
FIG. 2 is a schematic illustration of a development of the disclosed bodywork arrangement.

FIG. 2 shows a development of the bodywork arrangement according to FIG. 1. All the corresponding components have therefore been given the same reference numerals as in FIG. 1. In addition, there are secondary longitudinal members that are provided on the floor of the passenger compartment 2 and that are articulated to secondary node points K7' of the floor cross-member 7. Another inner structural element 17 is articulated to each secondary node point K7' and connects the secondary node point K7' to the node point K8 to that the front-end longitudinal member 5 is connected to the splashboard cross-member 8.

In this manner, forces that are introduced by means of the front-end longitudinal member 5 are transmitted through the additional inner structural element 17 via the secondary node point K7' into the secondary longitudinal member 16. The bodywork arrangement can at this location receive larger forces than if forces had to be absorbed only by the "primary" longitudinal member known from the prior art.

Figure 3:
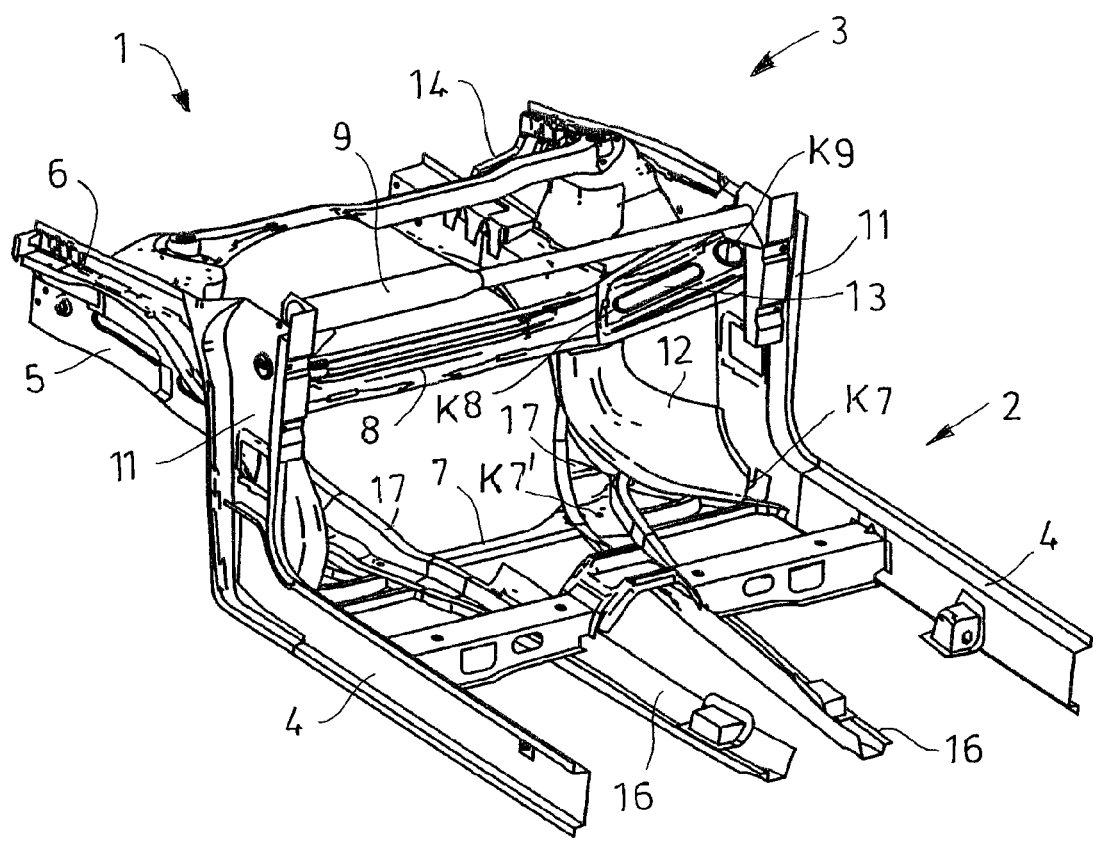
FIG. 3 is a fragmentary perspective view of the disclosed bodywork arrangement.

FIG. 3 is a perspective illustration of a self-supporting bodywork arrangement 1. The longitudinal members and cross-members schematically illustrated in the previous figures and the lateral structural elements are in this embodiment constructed as bodywork-typical sheet metal elements. The basic structure corresponds to the embodiment of FIG. 2. All the components that are contained in the embodiment according to FIG. 2 are therefore given the same reference numerals in FIG. 3.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. A symmetrical bodywork arrangement for a passenger compartment and a front end of a vehicle having on each side of the vehicle structural components comprising:
   a first longitudinal member provided at a lower portion of the passenger compartment;
   a second longitudinal member arranged in the front end;
   a third longitudinal member arranged in the front end and disposed above the second longitudinal member;
   a floor cross-member provided in a front region of the passenger compartment;
   a splashboard cross-member provided in a front region of the passenger compartment;
   an armature cross-member provided in a front region of the passenger compartment;
   an A-column beam laterally arranged in a front region of the passenger compartment;
   a lower lateral structural element that joins the floor cross-member and the splashboard cross-member to form a lower trapezoidal sub-assembly;
   an upper lateral structural element that joins the splashboard cross-member and the armature cross-member to form an upper trapezoidal sub-assembly, wherein the upper trapezoidal sub-assembly and the lower trapezoidal sub-assembly define a foot space of the passenger compartment;
   a first node point is defined where the second longitudinal member is articulated to the splashboard cross-member; and
   wherein the upper lateral structural element are connected between the first node point at the splashboard cross-member and a second node point of the armature cross-member.

2. The bodywork arrangement of claim 1 further comprising:
- a fourth longitudinal member is provided on the floor of the passenger compartment and that are articulated to a third node point at the floor cross-member; and
- a second lower structural element is connected between the third node point of the floor cross-member and to the first node point.

3. The bodywork arrangement of claim 1 wherein the splashboard cross-member is constructed as a shell element and the upper lateral structural elements are constructed as a shell element that is connected to the splashboard cross-member.

4. A bodywork arrangement for a passenger compartment and a front end of a vehicle comprising:
- a first pair of longitudinal members provided at a lower portion of the passenger compartment;
- a second pair of longitudinal members arranged in the front end;
- a third pair of longitudinal members arranged in the front end and disposed above the second pair of longitudinal members;
- a floor cross-member provided in a front region of the passenger compartment;
- a splashboard cross-member provided in a front region of the passenger compartment;
- an armature cross-member provided in a front region of the passenger compartment;
- a pair of A-column beams laterally arranged in a front region of the passenger compartment;
- a pair of lower lateral structural elements that join the floor cross-member and the splashboard cross-member to form a lower trapezoidal sub-assembly;
- a pair of upper lateral structural elements that join the splashboard cross-member and the armature cross-member to form an upper trapezoidal sub-assembly, wherein the upper trapezoidal sub-assembly and the lower trapezoidal sub-assembly define a foot space of the passenger compartment;
- a pair of first node points are defined where the second pair of longitudinal members is articulated to the splashboard cross-member; and
- wherein the pair of upper lateral structural elements are connected between the first pair of node points at the splashboard cross-member and a second pair of node points of the armature cross-member.

5. The bodywork arrangement of claim 4 further comprising:
- a fourth pair of longitudinal members are provided on the floor of the passenger compartment and that are articulated to a third pair of node points at the floor cross-member; and
- a second pair of lower structural elements are connected between the third pair of node points of the floor cross-member and to the first node point.

6. The bodywork arrangement of claim 4 wherein the splashboard cross-member is constructed as a shell element and the upper lateral structural elements are constructed as a shell element that is connected to the splashboard cross-member.

7. A front end and passenger compartment assembly for a vehicle comprising:
- a lower trapezoidal sub-assembly including a floor cross-member disposed at a front region of a floor, a splashboard cross-member disposed above and forward of the floor cross-member, and two lower lateral structural elements extending upwardly and forward of the floor cross-member that converge toward the splashboard cross-member;
- an upper trapezoidal sub-assembly including an armature cross-member disposed above the floor cross-member, and including two upper lateral structural elements extending downwardly and forward of the armature cross-member that converge toward and are connected to the splashboard cross-member; and
- a lower longitudinal member connected to the splashboard cross-member and extending into the front end, wherein the lower trapezoidal sub-assembly and the upper trapezoidal sub-assembly define a foot space of the passenger compartment.

8. The front end and passenger compartment assembly of claim 7 further comprising an upper longitudinal member connected to the armature cross-member and extending into the front end.

9. The front end and passenger compartment assembly of claim 8 further comprises a front lateral structural element that extends between the lower longitudinal member and the upper longitudinal member at a location spaced from and forward of the splashboard.

10. The front end and passenger compartment assembly of claim 7 further comprising an A-column on both lateral sides of the vehicle that extends vertically between the floor cross-member and the armature cross-member, and wherein the splashboard cross-member is inboard of the A-columns.

* * * * *